(12) United States Patent
Mullins et al.

(10) Patent No.: US 6,968,189 B1
(45) Date of Patent: Nov. 22, 2005

(54) NEIGHBORING CELL LIST GENERATION IN A MOBILE SATELLITE COMMUNICATION SYSTEM

(75) Inventors: Dennis Roy Mullins, London (GB); Mark Grayson, London (GB)

(73) Assignee: ICO Services Ltd., London (GB)

( * ) Notice: Subject to any disclaimer, the term of this patent is extended or adjusted under 35 U.S.C. 154(b) by 0 days.

(21) Appl. No.: 09/914,853

(22) PCT Filed: Mar. 1, 2000

(86) PCT No.: PCT/GB00/00725

§ 371 (c)(1),
(2), (4) Date: Nov. 26, 2001

(87) PCT Pub. No.: WO00/52848

PCT Pub. Date: Sep. 8, 2000

(30) Foreign Application Priority Data

Mar. 4, 1999 (GB) .................................. 99301632

(51) Int. Cl.[7] .......................... H04Q 7/20; H04B 7/185
(52) U.S. Cl. ...................... 455/434; 455/429; 455/437; 455/440; 455/13.1; 455/574; 455/343.2
(58) Field of Search ............................. 435/434, 422.1, 435/427, 429, 428, 432.1, 435.1, 436, 437, 435/440, 443, 12.1, 13.1, 515, 517, 572, 435/574, 343.1, 343.2, 343.3, 343.4; 370/311, 370/316, 329, 330, 331, 332

(56) References Cited

U.S. PATENT DOCUMENTS

| | | | |
|---|---|---|---|
| 5,404,355 A | * 4/1995 | Raith | .......................... 370/311 |
| 5,412,389 A | 5/1995 | Olds | ...................... 342/357.04 |
| 5,551,058 A | * 8/1996 | Hutcheson et al. | .......... 455/429 |
| 5,574,968 A | * 11/1996 | Olds et al. | .................... 455/428 |
| 5,649,291 A | * 7/1997 | Tayloe | .......................... 455/429 |
| 5,678,184 A | * 10/1997 | Cutler, Jr. et al. | ........... 455/436 |
| 5,915,221 A | * 6/1999 | Sawyer et al. | ............... 455/437 |
| 5,995,834 A | * 11/1999 | Moore | ......................... 455/434 |
| 6,181,946 B1 | * 1/2001 | Gettleman et al. | ........... 455/517 |
| 6,396,826 B1 | * 5/2002 | Ohlson et al. | ............... 370/320 |
| 6,542,716 B1 | * 4/2003 | Dent et al. | .................. 455/13.1 |
| 2002/0028668 A1 | * 3/2002 | Grrayson et al. | ............ 455/437 |

FOREIGN PATENT DOCUMENTS

| | | | |
|---|---|---|---|
| EP | 0662758 | 7/1995 | .......... H04B 7/185 |
| GB | 2303764 | 2/1997 | .......... H04B 7/204 |
| WO | 9613946 | 5/1996 | ............ H04Q 7/00 |

OTHER PUBLICATIONS

Internationa Search Report prepared by EPO, Apr. 12, 2000.

* cited by examiner

Primary Examiner—Rafael Perez-Gutierrez
(74) Attorney, Agent, or Firm—Michael J. Donohue; Davis Wright Tremaine LLP (57) ABSTRACT

A mobile communication system has a plurality of satellites and mobile stations. A mobile station is capable of communicating with more than one satellite. A satellite transmits a set of neighboring cell data to one of the mobile stations. The data set comprises first and second portions related to communication with a first and a second satellite of the plurality of satellites, respectively. When the data set is received the first time by the mobile station, it decodes both first and second data portions to establish a neighboring cell list, which is stored within the mobile station. When the mobile station receives subsequent transmissions of neighboring cell data, it need only decode either the first data portion or the second data portion based on the presence or absence of an alert message.

19 Claims, 7 Drawing Sheets

NEIGHBORING CELL LIST GENERATION IN A MOBILE SATELLITE COMMUNICATION SYSTEM

The present invention relates to a method of operating a mobile station in a mobile satellite telephone system and to a method of operating a satellite mobile telephone system.

Various proposals have been made for satellite mobile telephone systems. These include the Inmarsat-M system, the IRIDIUM™ system described in EP-A-0365885, the ICO™ system described in GB-A-2295296 and the ODYSSEY™ system described in EP-A-0510789.

A satellite mobile telephone system, in which the satellites are not in geosynchronous orbits, differs from a terrestrial mobile telephone system in that cells move relative to each other. In the case of the ICO system, described in GB-A-2295296, each satellite produces a plurality of beams, each of which corresponds to one cell of the system. The beams from one satellite do not move relative to each other. Consequently, for each cell, the neighbouring cells served by the same satellite remain the same at all times. Furthermore, the cells served by one satellite will also maintain a constant relationship with those served by another satellite following the same orbit. However, the ICO and other systems include satellites following a plurality of different orbits. Often the cells served by a satellite in one orbit will overly or be adjacent to cells served by another satellite. Since the satellites are in different orbits, the relationship between the cells served by one satellite and those served by another satellite in another orbit will vary with time.

Each mobile station in the network must be aware of the cells neighbouring the cell in which it is currently located when it is in idle mode. Accordingly, as in the case of GSM systems, for example, data identifying lists of neighbouring cells is transmitted in a broadcast control channel.

According to the present invention, the neighbouring cell data is split into at least two parts in the broadcast control channel. One part is relatively static and includes cells served by the same satellite. The first part may also include cells served by satellites in the same orbit, if yaw correction is employed to stop the foot prints of the satellites rotating on the earth as the satellite orbits. However, the cells of another satellite in the same orbit could be covered by their own block of neighbouring cell data. The other part changes relatively rapidly and includes cells served by satellites in other orbits. Supplementary data is preferably transmitted to the mobile station informing it when it needs to decode the relatively static neighbouring cell data. The rapidly changing data may be decoded by the mobile station each time it is transmitted or at predetermined intervals. A benefit of the present invention is a reduction in power consumption due a reduction in the processing of neighbouring cell data.

Accordingly, the applicant seeks protection for a method of operating a mobile station in a satellite mobile telephone system, the method comprising the steps of: decoding all of a set of neighbouring cell data transmitted in a broadcast channel to generate a neighbouring cell list; making signal measurements for the cells in said list and the current serving cell; decoding a portion only of the set of neighbouring cell data transmitted in the broadcast channel and modifying the neighbouring cell list in dependence thereon; and making signal measurements for the cells in said list and the current serving cell. The form of the neighbouring cell list is not important to the present invention in its broadest aspect. It is only necessary that the neighbouring cell list be sufficient to enable to mobile station to make signal measurements for neighbouring cells.

A "neighbouring cell" is one that is adjacent to, overlaps, is contained within or contains the cell on which the mobile station is currently camped.

Preferably, a method according to the present invention includes the steps of decoding a further portion of said set on reception of a decode instruction in the broadcast channel and modifying the neighbouring cell list in dependence thereon. The further portion preferably relates to the cells served by the same satellite.

Preferably, the neighbouring cell data comprises information identifying a beacon frequency for each cell.

A method according to the present invention preferably includes comparing said measurements; and if the best measurement is not for the currently serving cell, camping on the cell to which the best measurement applies. The "best" measurement may correspond to the signal with the greatest strength. However, this need not be the case. For instance, a strong signal may be subject to multi-path or co-channel interference, in which cases a measure of the corruption of the received and decoded data would be a more useful measure.

The applicant also seeks protection for a mobile station for a satellite mobile telephone system, the mobile station comprising transceiver means and control means, wherein the control means is programmed so as to cause the mobile station to operate according to a method embodying the present invention.

The applicant also seeks protection for a method of operating a mobile satellite telephone system comprising the steps of transmitting neighbouring cell data in a broadcast channel, the neighbouring cell data comprising a first portion relating to cells served by a first satellite in an orbit having a first plane and a second portion relating to cells served by a second satellite in an orbit having a second, different plane; and transmitting neighbouring cell data in the broadcast channel, the second part of the cell data being modified in dependence on the relative motion of the first and second satellites. Preferably, such a method includes transmitting a decode instruction when data in the first portion of the cell data is modified.

Preferably, the neighbouring cell data comprises information identifying a beacon frequency for each cell.

Embodiments of the present invention will now be described, by way of example, with reference to the accompanying drawings, in which:—

Figure 1:
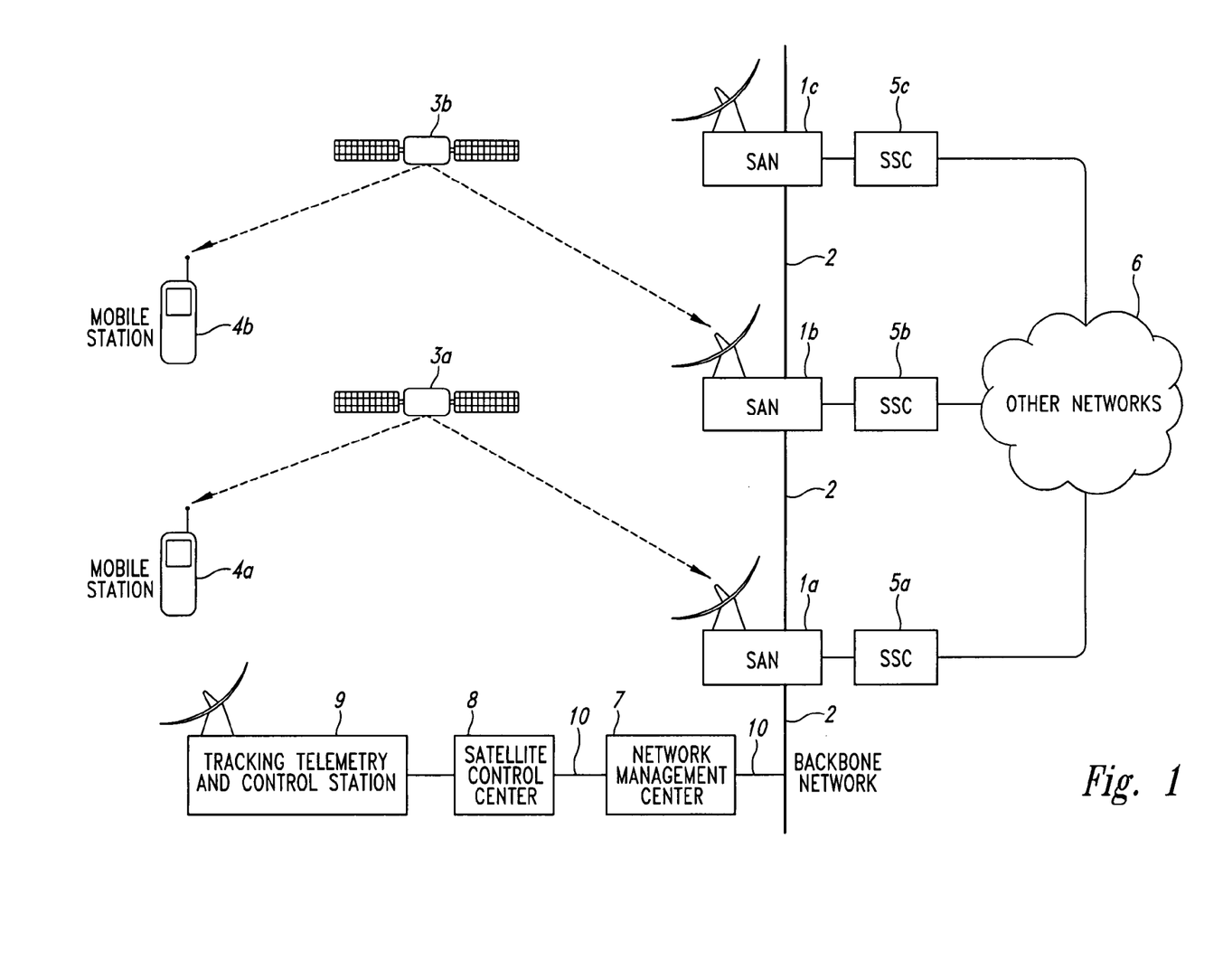
FIG. 1 illustrates a satellite mobile telephone system.

Referring to FIG. 1, a satellite mobile telephone system comprises a plurality of satellite access nodes 1a, 1b, 1c interconnected by a high capacity digital network 2 (hereinafter "the backbone network"), a plurality of satellites 3a, 3b, a plurality of a mobile stations 4a, 4b, gateway mobile satellite switching centres 5a, 5b, 5c providing connections between the satellite access nodes 1a, 1b, 1c and other networks 6; a network management centre 7, a satellite control centre 8 and a tracking, telemetry and control station 9. The network management centre 7, the satellite control centre 8 and the tracking, telemetry and control station 9 are interconnected by a lower capacity digital network 10 which is also connected to the backbone network 2. The other networks 6 comprise the public switched telephone network (PSTN), cellular telephone networks and the like.

The satellite control centre 8 and the tracking, telemetry and control station 9 control the operation of the satellites 3a, 3b, for instance setting transmit power levels and transponder input tuning, as directed by the network management centre 7. Telemetry signals from the satellites 3a, 3b are received by the tracking, telemetry and control station 9 and processed by the satellite control centre 8 to ensure that the satellites 3a, 3b are functioning correctly.

The satellites 3a, 3b repeatedly broadcast control information in broadcast control channels (BCCH). A mobile station 4a repeatedly receives and decodes the information in the BCCH broadcast by the satellite 3a, 3b currently serving it.

During a telephone call, a mobile station 4a, 4b communicates with a satellite 3a, 3b via a half duplex channel comprising a downlink channel and an uplink channel. The channels comprise TDMA time slots on frequencies allocated on initiation of the call or re-allocated during a call.

The satellites 3a, 3b are in non-geostationary orbits and comprise generally conventional satellites, such as the known Hughes HS601 model, and may include features as disclosed in GB-A-2288913. Each satellite 3a, 3b is arranged to generate an array of beams covering a footprint beneath the satellite, each beam including a number of different frequency channels and time slots.

Figure 2:
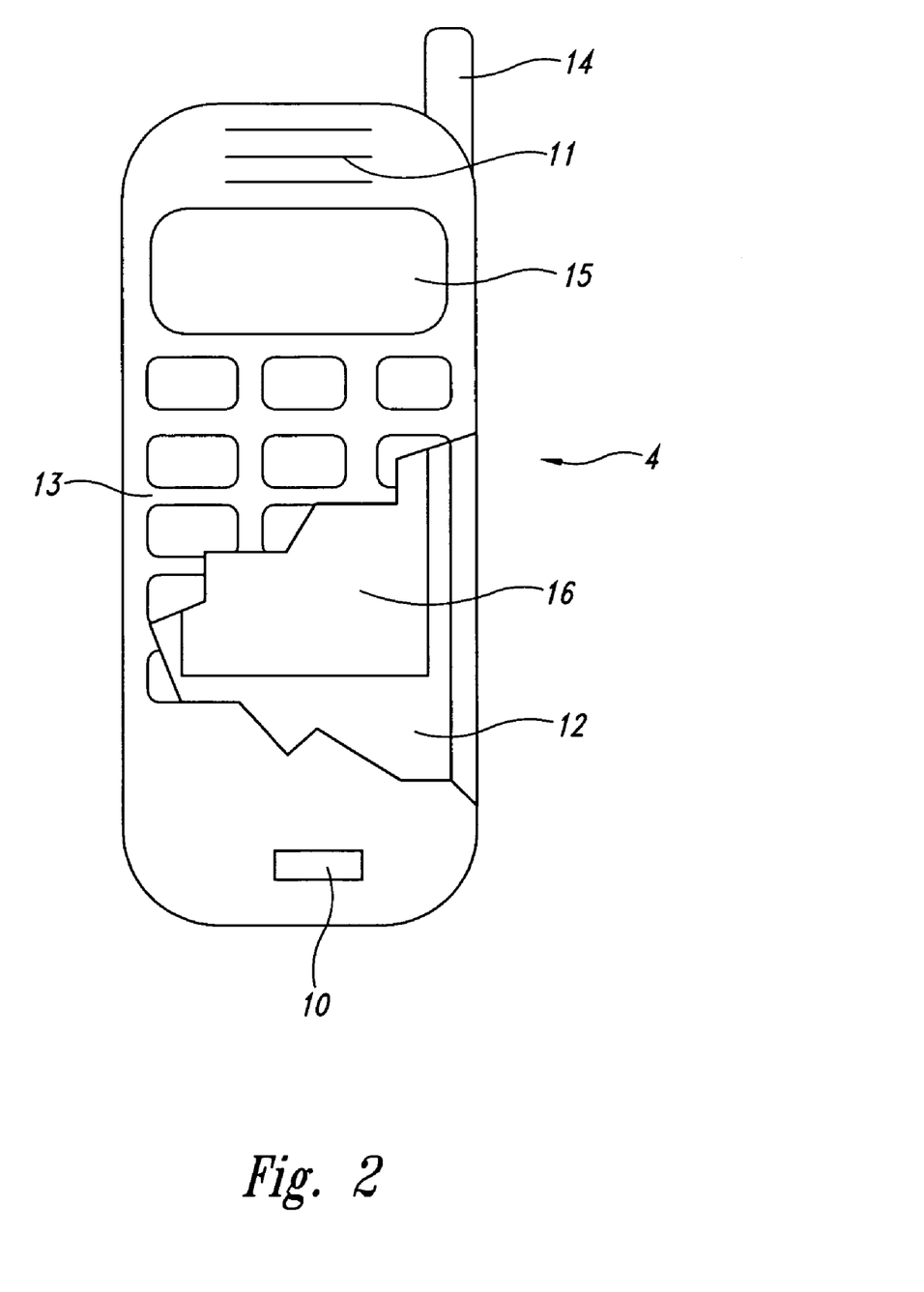
FIG. 2 shows a mobile station.

Referring to FIG. 2, a mobile station 4 is generally similar to the units presently available for GSM networks and comprises a codec, a controller 16, a microphone 10, a loudspeaker 11, a battery 12, a keypad 13, a radio frequency interface, an antenna 14, a display 15 and subscriber identification module (SIM) smart card.

The codec comprises a low bit-rate coder, which generates a speech bit stream at 3.6 kbits/s, together with a channel coder, which applies error correction codes to the speech bit stream to produce an encoded bit stream at 4.8 kbits/s. The low bit-rate coder is a linear predictive coder. The channel coder uses Viterbi coding. The codec also comprises complementary decoders.

The SIM includes a processor and a non-volatile memory which stores data identifying the subscriber and data for use in encrypted communication.

Figure 3:
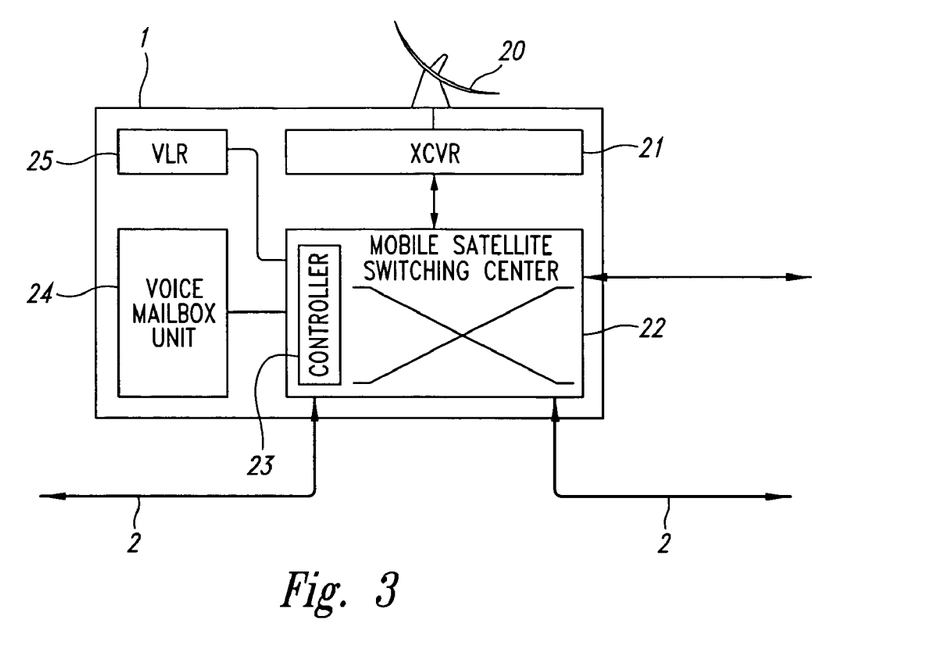
FIG. 3 is a schematic diagram of a satellite access node of the system of FIG. 1.

Referring to FIG. 3, a satellite access node 1 comprises a dish antenna 20 mounted for tracking satellites, transmitter and receiver circuits 21 including amplifiers, multiplexers, demultiplexers and codecs, a visited mobile satellite switching centre 22 including a controller 23, a visitor location register 25 and a voice mail box unit 24. The mobile satellite switching centre 22 is coupled for communications signals to the backbone network 2, to a gateway and to the transmitter and receiver circuits 21. The controller 23 is coupled for data signals to the visitor location register 25 and the voice mail box unit 24 and may also send and receive data signals via the backbone network 2.

The controller 23 responds to addresses on incoming communications signals, from the antenna 20, the gateway and the backbone network 2, by controlling the mobile satellite switching centre 22 to output the communications signals on the appropriate paths to their destinations, i.e. the antenna 20, the gateway or the backbone network 2.

The visitor location register 25 maintains a record of each of the subscribers registered with the satellite access node 1. The voice mail box unit 24 provides storage space for voice mail messages for subscribers.

Figure 4:
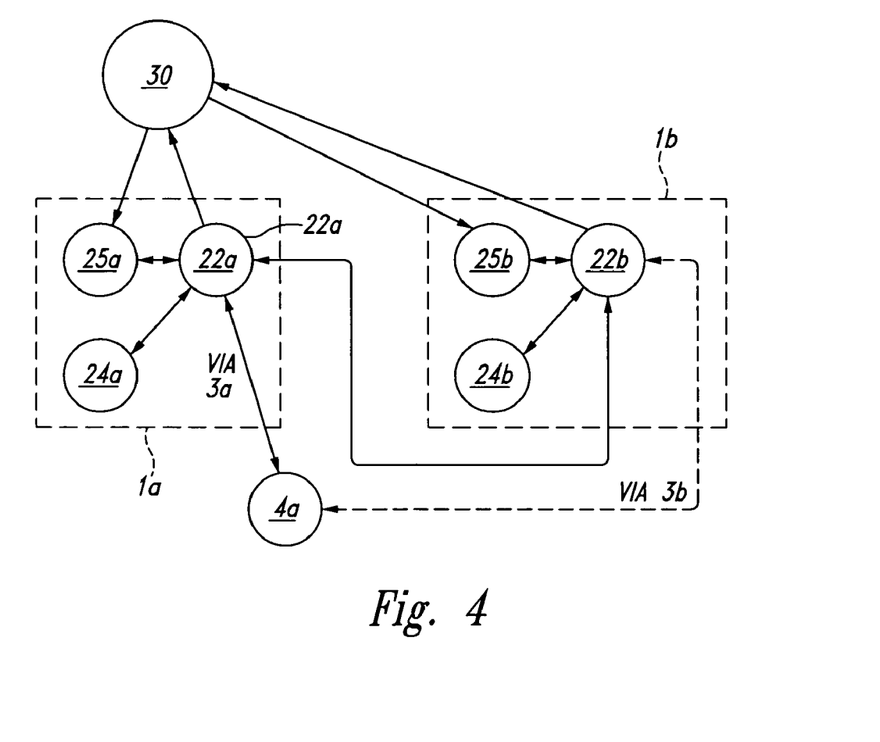
FIG. 4 is a data flow diagram for the system of FIG. 1.

Referring to FIG. 4, a database 30, called the home location register, contains records relating to each mobile station 4a, 4b. The record contains the mobile station's identity (international Mobile Subscriber Identity or IMSI) and the current address of the visitor location register 25a, 25b where the mobile station 4a, 4b is registered. The visitor location register 25a, 25b contains a part copy of the home location register information (e.g. which services are subscribed to), the status of the mobile station (whether it is "local" or "global" the geographical position of the mobile station, the address of home location register where the mobile station is a subscriber (to enable billing and other data to be collected at a single point), the currently active satellite access node with which the mobile station is in communication via a satellite, an individual enciphering key and the address of an associated voice mail box unit location.

The home location register 30 may be located in the network management centre 7 (see FIG. 1) or may be distributed among the satellite access nodes 1a, 1b, 1c (see FIG. 1) or may be in another network, e.g. when a GSM subscriber roams onto the satellite network.

Referring to FIGS. 1 to 4, a mobile station 4a may be registered with one of two distinct statuses; "local" in which the mobile station 4a is permitted to communicate only through one local area or part of the satellite system network, and "global", which entitles the mobile station 4a to communicate through any part of the satellite mobile telephone system.

The mobile station 4a performs an automatic registration process (location update), of the kind well known in the art of cellular terrestrial communications, on each occasion when the mobile station 4a is used for an outgoing call, when the mobile station 4a is switched on, periodically whilst the mobile station 4a is operating and when the mobile station 4a has been unpageable for a predetermined period. As is conventional, the location update takes the form of transmitting of a signal identifying the mobile station 4a (e.g. by transmitting its telephone number on a random access channel). The mobile station 4 decides to camp on a particular cell on the basis of measurements of signals on beacon frequencies and the random access channel used is the one associated with the cell on which the mobile station 4 decides to camp.

The transmitted signal is picked up by one of the satellites 3a. From the received random access channel signal, the satellite access node 1a serving the satellite 3a which sets up a dedicated channel for the mobile station 4a. From the random access channel signal, the satellite access node 1a derives the propagation path time and doppler shift and communicates this to the mobile station 4a in an immediate assignment message. The propagation time is actually send as the difference between actual propagation time and a reference propagation time.

The first message sent on the assigned channel by the mobile station 4a is the "initial message" and when this is received the satellite access node 1a, calculation of the mobile station's position using the propagation time and doppler data is triggered. The position of the mobile station 4a is added to the "initial message" which is then passed on to the visitor location register 25a where the mobile station 4a is registered.

At this stage, the visitor location register 25a can be used to confirm that the mobile station 4a has a subscription for service in the area for which it is located or conversely when first registering with the visitor location register 25a to use information provided in the initial message to derive the address of the home location register and to contact the home location register during which a part copy of the home location register information will be transferred to the visitor location register 25a and the data in the home location register which points to the visitor location register 25a is updated. The location of the mobile station 4a is thus stored in the database of the visitor location register 25a.

As the mobile station 4a and the cells move relative to one another, the visitor location register 25a may determine that the mobile station 4a should be handled via another satellite access node 1b. Consequently, the visitor location register record of the mobile station 4a is amended.

When a mobile terminated call is made to the mobile station 4a, it is directed to the visited mobile satellite switching centre 22a at which the mobile station 4a is registered. The visited mobile satellite switching centre 22a causes a paging signal to be sent to the cells where the called mobile station 4a is expected to be, i.e. via the satellites 3a, 3b serving cells covering the mobile station's location. These cells where the mobile station 4a is expected to be are determined from the mobile station's location, stored in the visitor location register 25a, and knowledge of the movement of cells across the surface of the earth. When the mobile station 4a receives the paging signal, it enters into a dialogue with the network to obtain a channel for the call. If the mobile station 4a does not respond to the paging signal, the network will inform the calling party that the mobile station 4a cannot be reached.

When a mobile originating call is to be made, the user of the mobile station 4a enters the number to be dialled and presses a "send" key. The mobile station 4a responds by sending an access request using a random access channel on a dedicated frequency, corresponding to a cell, to the network via one visible satellite 3a, 3b. The satellite access node 1a responds on the basis of the cell from which it receives the access request. The selected satellite access node 1a sends a immediate assignment message using a access grant channel. The immediate assignment message includes the physical parameters of a stand-alone dedicated control channel assigned by the network. The radio link setup is completed using the stand-alone dedicated control channel and then the connection of the call is attempted. On connection of the call, the mobile station 4a is allocated a traffic channel that is then used for the call.

Figure 5:
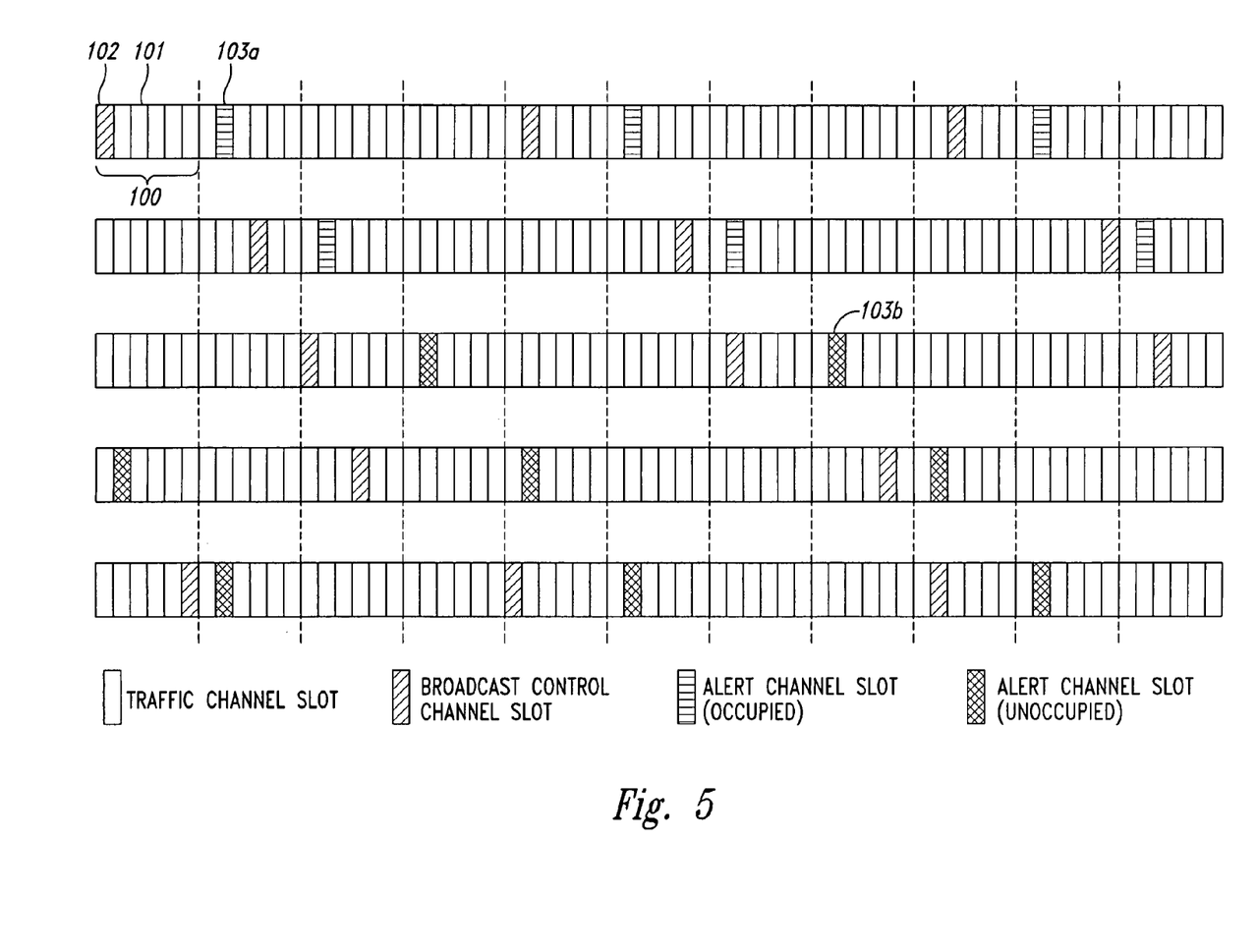
FIG. 5 shows the parts of the TDMA frame structure of the system of FIG. 1 that are relevant to the present invention.

Referring to FIG. 5, each TDMA frame 100 transmitted to a cell comprises six time slots. Each time slot of a frame may be occupied by a traffic channel 101, a broadcast control channel slot 102 or an alert channel slot 103a, 103b. When no alert message is being transmitted, no power is radiated during the alert channel slot 103b.

Figure 6:
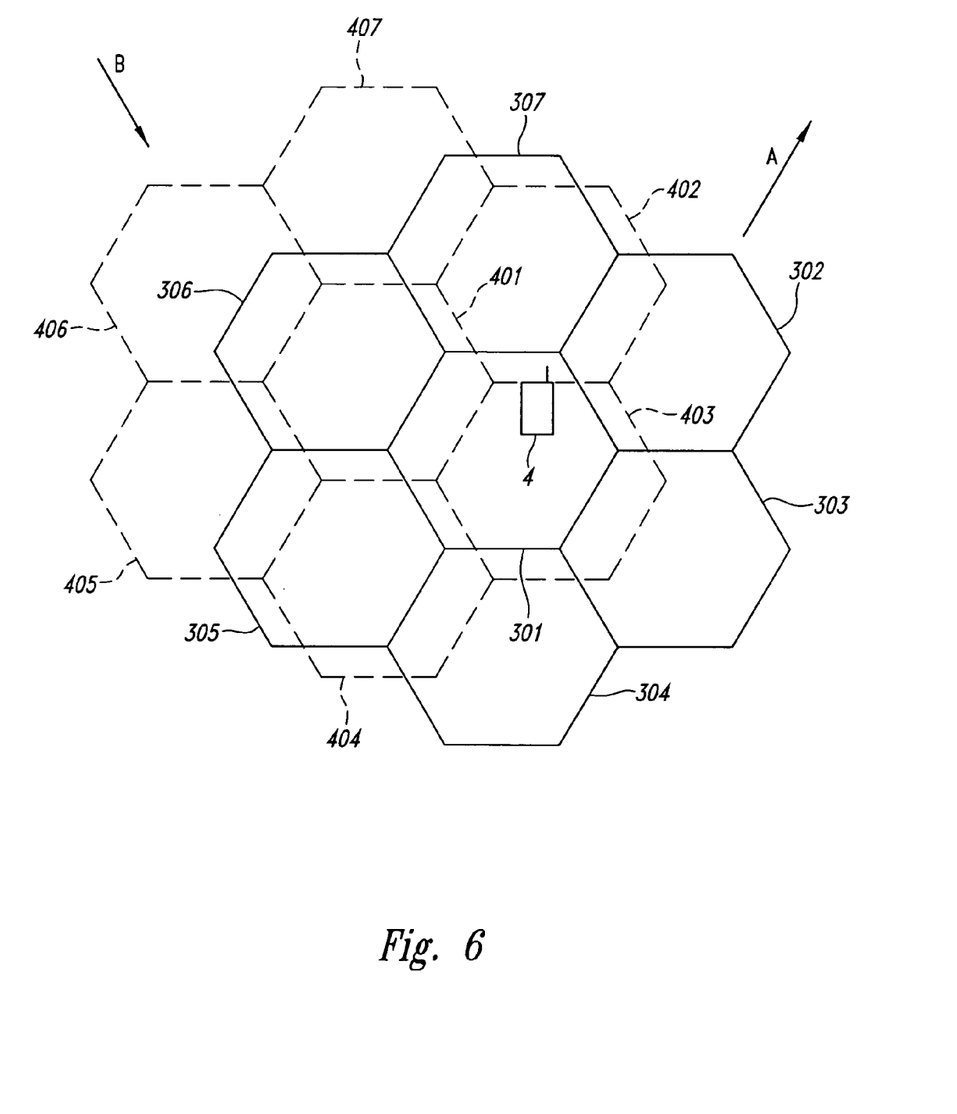
FIG. 6 shows the relative positions of the footprints of two satellites at a first instant.

Referring to FIG. 6, the first satellite 3a FIG. 1) serves first to seventh cells 301, 302, 303, 304, 305, 306, 307 and the second satellite 3b (FIG. 1) serves eighth to fourteenth cells 401, 402, 403, 404, 405, 406, 407. The first cell 301 is surrounded by the second to seventh cells 302, . . . , 307 and the eighth cell 401 is surrounded by the ninth to fourteenth cells 402, . . . , 407. The eighth to fourteenth cells 401, . . . , 407 overlap with the first to seventh cells 301, . . . , 307. The ground track of the first satellite 3a is indicated by arrow A and the ground track of the second satellite 3b is indicated by arrow B. A mobile station 4 is located in the first cell 301 towards its leading side. It can be seen that the neighbouring cells of the first cell are the second to seventh cells 302, . . . , 307 and the eighth to eleventh cells 401, . . . , 404.

Figure 7:
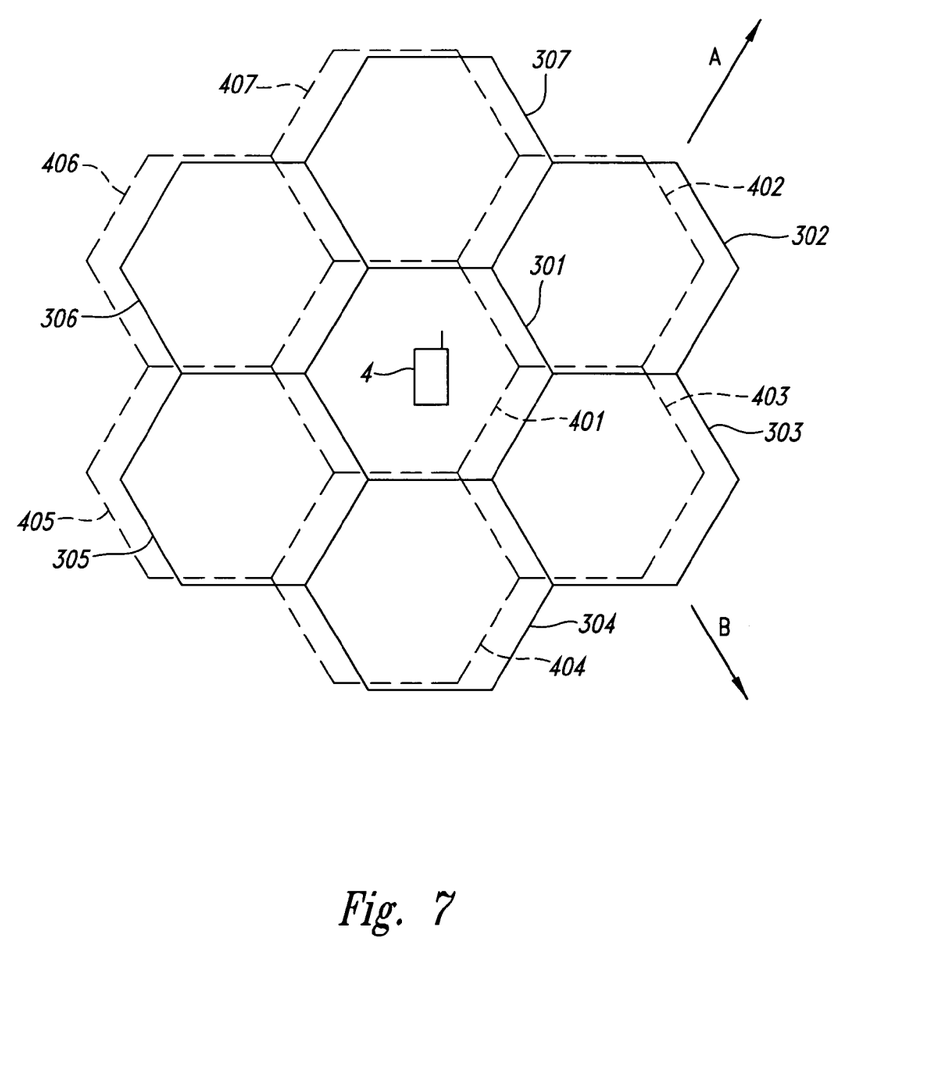
FIG. 7 shows the relative positions of the footprints of the two satellites at a second instant a short time after the first instant.

Referring to FIG. 7, a short time later, the footprints of both satellites 3a, 3b have moved across the earth's surface. Assuming for the sake of this explanation that the mobile station 4 has not moved relative to the earth's surface, it can be seen that the mobile station is more centrally located in the first cell 301 and that the neighbouring cells of the first cell are now the second to seventh cells 302, . . . , 307, as before, and the eighth to fourteenth cells 401, . . . , 407 which virtually match the positions of the first to seventh cells 301, . . . , 307.

Figure 8:
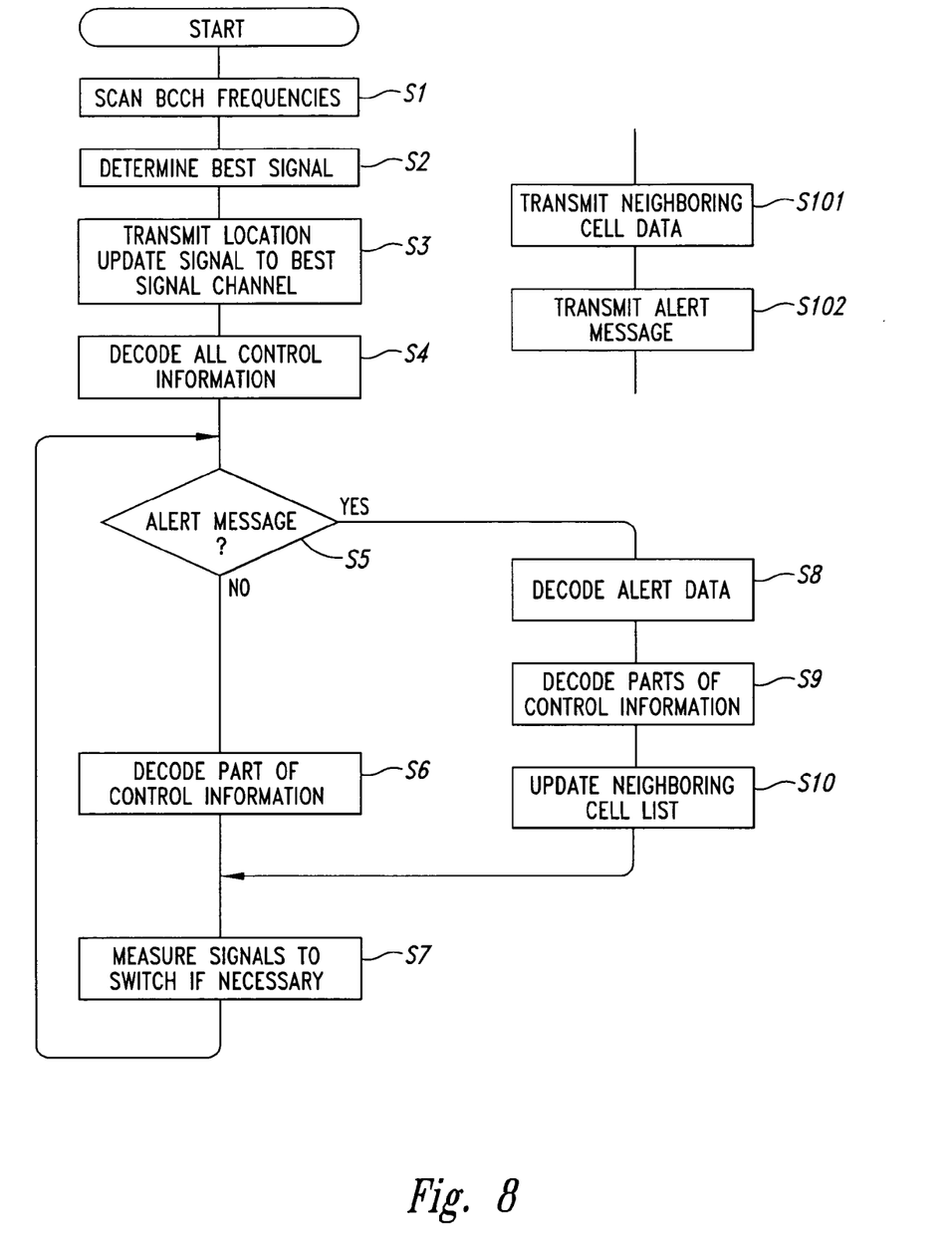
FIG. 8 is a flow diagram illustrating the operation of a mobile station and the network.

Referring to FIG. 8, considering now the situation where the mobile station 4 is switched on when positioned as shown in FIG. 6, the mobile station 4 initially scans all broadcast control channel frequencies (step s1) and determines which has the best signal (in the present example this will be assumed to be the first cell 301) (step s2). It then transmits a location update signal in a random access channel of the first cell 301 (step s3).

The mobile station 4 decodes the all of the control information in the broadcast control channel of the first cell 301 including the whole of the neighbouring cell data (step s4). The neighbouring cell data is transmitted by the network (step s101) in the broadcast control channel in two discrete blocks, a first one relating to the neighbouring cells served by the first satellite 3a and a second one relating to the neighbouring cells served by the second satellite 3b. Once the broadcast control channel information has been decoded, the mobile station 4 ceases to decode the first block of neighbouring cell data transmitted in the broadcast control channel. However, the mobile station 4 will monitor the alert channel (step s5). Under unchanging circumstances, no power is radiated in the alert channel slots by the network and consequently, the mobile station's controller does not need to process any information.

The mobile station 4 periodically decodes the second neighbouring cell data block (step s6) and measures the beacon frequencies identified by its neighbouring cell list and the beacon frequency of the cell 301, on which it is camped, to determine whether it should camp on another cell (step s7).

When the footprints of the satellites 3a, 3b move into the relation shown in FIG. 7, the neighbouring cell data relating to cells served by the first satellite 3a remains valid but the neighbouring cell data relating to the cells served by the second satellite 3b is no longer valid. Consequently, the network modifies the transmitted neighbouring cell data in the second neighbouring cell data block (step s101) and this is decoded by the mobile station 4 (step s6). At this time, the first neighbouring cell data block is not decoded.

Under normal circumstances, the mobile station 4 will only need to decode the first neighbouring cell data block once when it first camps on a cell. However, the beacon frequencies of one or more of the cells (301, . . . , 307) covered by the first neighbouring cell data block may change, for instance because the cells are moving into an area with different spectrum allocation regulations. In this situation, an alert message is transmitted (step s102). The mobile station 4 receives the alert information (step s5) which is decoded by the mobile station's controller (step s8). The controller determines that there has been or will be a change in the first neighbouring cell data block in the control information and controls the mobile station 4 to start to decode those broadcast control channel bursts containing the first neighbouring cell data block (step s9). The controller then updates the neighbouring cell list (step s10) and uses the modified list to control subsequent measurements of beacon signals (step s7). The mobile station 4 continues to repeatedly check for an alert message and decode the second neighbouring cell data block.

When the mobile station 4 determines that it should camp on another cell, it will know the broadcast control channel frequency for the new cell because it will have been provided in the neighbouring cell data. As mentioned above, the mobile station 4 initially decodes all of the neighbouring cell data from the new broadcast control channel and then operates as described above; monitoring the alert channel and then only decoding the first neighbouring cell data block when a change therein in indicated by a signal in the alert channel.

In the foregoing description, each satellite serves seven cells. This is fewer than would be likely in practice. However, the small number of cells has been used in order that the present invention may be more easily understood.

In another embodiment, the neighbouring cell data is divided into three blocks. A first block is substantially static and relates to cells served by the a first satellite. A second block changes relatively slowly and relates to cells served by a second satellite in the same orbital plane as the first satellite. A third block changes relatively rapidly and relates to cells served by a third satellite in an obital plane different to that of the first satellite.

When a mobile station 4 first camps on a cell, it decodes all of the neighbouring cell data in the broadcast control channel. Thereafter, it repeatedly decodes the third block and only decodes the first and second block on receipt of characteristic alert messages.

The foregoing description uses terminology familiar to the skilled person from descriptions of GSM systems in order to make the present invention more readily comprehensible. However, the present invention is not limited to systems similar to GSM systems.

What is claimed is:

1. A method of operating a mobile station in a satellite communication system wherein the mobile station is capable of communicating alternatively with a first satellite or a second satellite of the satellite communication system, the method comprising:
   on a plurality of occasions, receiving a set neighboring cell data transmitted in a broadcast from one of the first and second satellites, the set comprising first and second data portions relating to communication with the first and second satellites, respectively;
   upon a first of the plurality of occasions, decoding the first and second data portions; and
   upon subsequent ones of the plurality of occasions, decoding only a selected one of the first and second data portions.

2. The method of claim 1 wherein only the second data portion is decoded upon subsequent ones of the plurality of occasions if no alert message is received by the mobile station.

3. The method of claim 2, further comprising modifying the set of neighboring cell data in response to decoding the second data portion.

4. The method of claim 1 wherein only the first data portion is decoded upon subsequent ones of the plurality of occasions if an alert message is received by the mobile station.

5. The method of claim 4, further comprising modifying the set of neighboring cell data in response to decoding the first data portion.

6. A mobile station in a satellite communication system having a plurality of satellites, the mobile station comprising:
   a receiver capable of communicating alternatively with a first satellite or a second satellite of the plurality of satellites, the receiver receiving a set of neighboring cell data transmitted in a broadcast from one of the first and second satellites on a plurality of occasions, the received data set comprising first and second data portions relating to communication with the first and second satellites, respectively; and
   a decoder to decode the received data set, the decoder configured to decode the first and second data portions upon a first of the plurality of occasions that the receiver receives the data set, and to decode only a selected one of the first and second data portions upon subsequent ones of the plurality of occasions that the receiver receives the data set.

7. The mobile station of claim 6 wherein the receiver is configured to receive an alert message and the decoder is configured to decode only the second data portion upon subsequent ones of the plurality of occasions if no alert message is received by the receiver.

8. The mobile station of claim 7, further comprising a data structure to store the set of neighboring cell data in response to decoding the second data portion.

9. The mobile station of claim 6 wherein the receiver is configured to receive an alert message and the decoder is configured to decode only the first data portion upon subsequent ones of the plurality of occasions if an alert message is received by the receiver.

10. The mobile station of claim 9, further comprising a data structure to store the set of neighboring cell data in response to decoding the first data portion.

11. A method of operating a mobile station in a satellite mobile telephone system, the method comprising the steps of:
   decoding all of a set of neighbouring cell data transmitted in a broadcast channel to generate a neighbouring cell list;
   making signal measurements for the cells in said list and a current serving cell;
   decoding a portion only of the set of neighbouring cell data transmitted in the broadcast channel and modifying the neighbouring cell list in dependence thereon; and
   making signal measurements for the cells in said modified list and the current serving cell.

12. A method according to claim 11, including:
   comparing said measurements for the cells in said modified list and the current serving cell; and
   if the best measurement is not for the currently serving cell, camping on the cell to which the best measurement applies.

13. A mobile station for a satellite mobile telephone system, the mobile station comprising transceiver means and control means, wherein the control means is programmed so as to cause the mobile station to operate according to claim 11.

14. A method according to claim 11, including the steps of decoding a further portion of said set on reception of a decode instruction in the broadcast channel and modifying the neighbouring cell list in dependence thereon.

15. A method according to claim 14, wherein the data in said portion changes more rapidly than the data in said further portion.

16. A method according to claim 11, wherein the neighbouring cell data comprises information identifying a beacon frequency for each cell.

17. A method of operating a mobile satellite telephone system comprising the steps of:

transmitting neighbouring cell data in a broadcast channel, the neighbouring cell data comprising a first portion relating to cells served by a first satellite in an orbit having a first plane and a second portion relating to cells served by a second satellite in an orbit having a second, different plane; and transmitting neighbouring cell data in the broadcast channel, wherein the second portion of the cell data being modified in dependence on the relative motion of the first and second satellites.

18. A method according to claim 17, wherein the neighbouring cell data comprises information identifying a beacon frequency for each cell.

19. A method according to claim 18, including transmitting a decode instruction when data in the first portion of the cell data is modified.

* * * * *